United States Patent
Schwenter et al.

(10) Patent No.: US 11,971,283 B2
(45) Date of Patent: Apr. 30, 2024

(54) COIL APPARATUS OF AN OSCILLATION SENSOR OR OF AN OSCILLATION EXCITER, MEASURING TRANSDUCER AND MEASURING INSTRUMENT

(71) Applicant: Endress+Hauser Flowtec AG, Reinach (CH)

(72) Inventors: Benjamin Schwenter, Breitenbach (CH); Claude Hollinger, Aesch (CH); Marc Werner, Grenzach-Wyhlen (DE)

(73) Assignee: Endress+Hauser Flowtec AG, Reinach (CH)

( * ) Notice: Subject to any disclaimer, the term of this patent is extended or adjusted under 35 U.S.C. 154(b) by 562 days.

(21) Appl. No.: 17/266,967

(22) PCT Filed: Jul. 31, 2019

(86) PCT No.: PCT/EP2019/070658
§ 371 (c)(1),
(2) Date: Feb. 8, 2021

(87) PCT Pub. No.: WO2020/030502
PCT Pub. Date: Feb. 13, 2020

(65) Prior Publication Data
US 2021/0310842 A1 Oct. 7, 2021

(30) Foreign Application Priority Data
Aug. 8, 2018 (DE) .................... 10 2018 119 330.0

(51) Int. Cl.
*G01F 1/84* (2006.01)
*G01N 9/00* (2006.01)
*H01F 27/28* (2006.01)

(52) U.S. Cl.
CPC .......... *G01F 1/8422* (2013.01); *G01F 1/8427* (2013.01); *G01N 9/002* (2013.01);
(Continued)

(58) Field of Classification Search
CPC ..... G01F 1/8422; G01F 1/8427; G01N 9/002; G01N 2009/006; H01F 27/2804; H01F 2027/2809
See application file for complete search history.

(56) References Cited

U.S. PATENT DOCUMENTS

| 5,349,872 A | 9/1994 | Kalotay et al. |
| 9,927,380 B2 | 3/2018 | Muto et al. |
| (Continued) | | |

FOREIGN PATENT DOCUMENTS

| CN | 102348963 A | 2/2012 |
| CN | 102472652 A | 5/2012 |
| (Continued) | | |

*Primary Examiner* — Natalie Huls
*Assistant Examiner* — Sharad Timilsina
(74) *Attorney, Agent, or Firm* — Kelly J. Smith; Endress+Hauser (USA) Holding, Inc.

(57) ABSTRACT

The present disclosure relates to a coil apparatus of an oscillation sensor or exciter of a measuring transducer or a measuring instrument for measuring a density or a mass flow of a medium flowing through a measuring tube, comprising: a circuit board, at least one coil adapted for registering or producing a time varying magnetic field, wherein the at least one coil has a first coil end and a second coil end, wherein the coil apparatus has four contacting elements, wherein the circuit board has a cutting plane extending perpendicularly to the faces, wherein the cutting plane divides the faces into a first side and a second side, wherein one contacting element of a pair of contacting elements is arranged on the first side, and wherein one contacting element of a pair of contacting elements is arranged on the second side.

15 Claims, 3 Drawing Sheets

(52) U.S. Cl.
CPC ... *H01F 27/2804* (2013.01); *G01N 2009/006* (2013.01); *H01F 2027/2809* (2013.01)

(56) References Cited

U.S. PATENT DOCUMENTS

| | | |
|---|---|---|
| 2009/0145244 A1 | 6/2009 | Rieder et al. |
| 2009/0173169 A1 | 7/2009 | Bitto et al. |
| 2010/0031755 A1 | 2/2010 | Bitto et al. |
| 2011/0291790 A1 | 12/2011 | Okumura et al. |
| 2012/0031198 A1* | 2/2012 | Skallebaek ............ G01F 1/662 |
| | | 29/840 |
| 2017/0003156 A1 | 1/2017 | Braun et al. |
| 2017/0278619 A1 | 9/2017 | Lee et al. |
| 2018/0248585 A1* | 8/2018 | Saito .................... H04B 5/0081 |

FOREIGN PATENT DOCUMENTS

| | | | |
|---|---|---|---|
| CN | 103562690 A | 2/2014 | |
| DE | 102015120087 A1 * | 5/2017 | |
| DE | 102015120087 A1 | 5/2017 | |
| DE | 102017106211 A1 | 7/2018 | |
| EP | 1223412 A1 * | 7/2002 | ........... G01F 1/8409 |
| EP | 3246669 A1 | 11/2017 | |
| EP | 3340289 A1 | 6/2018 | |
| RU | 2155939 C2 | 9/2000 | |

* cited by examiner

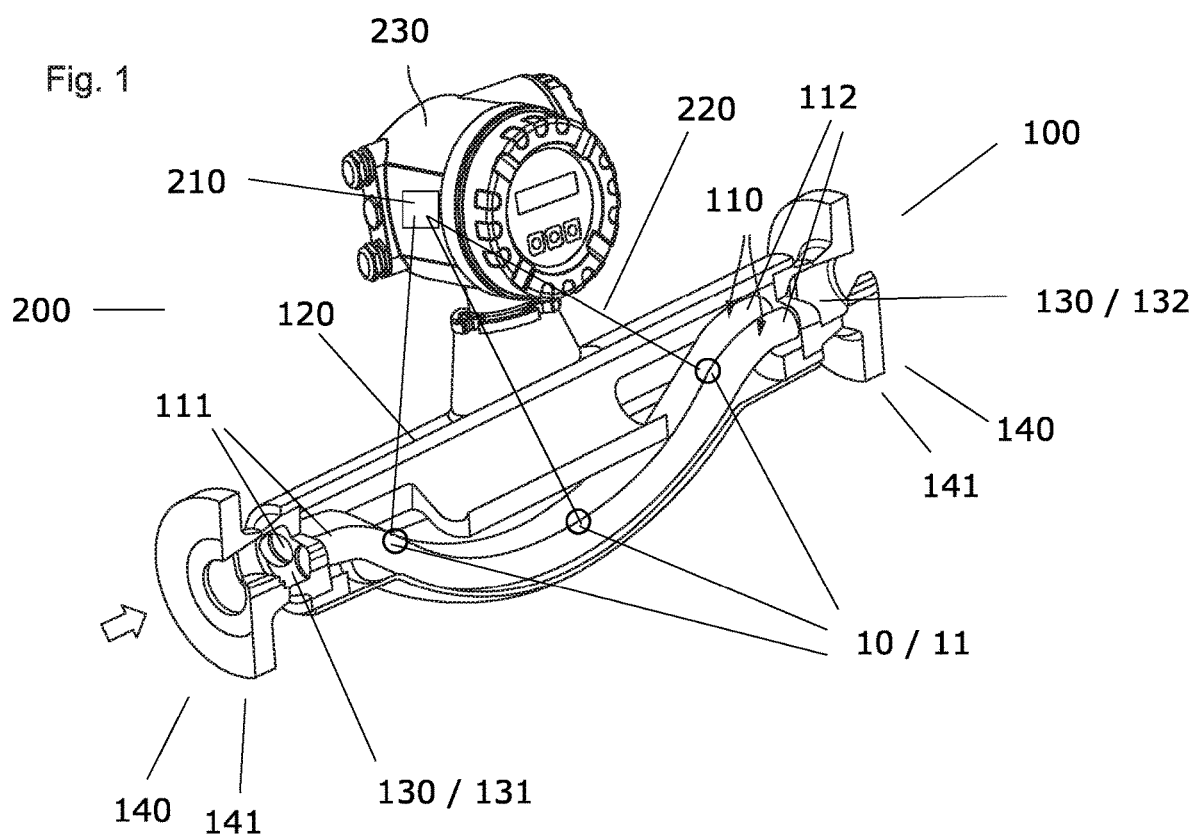

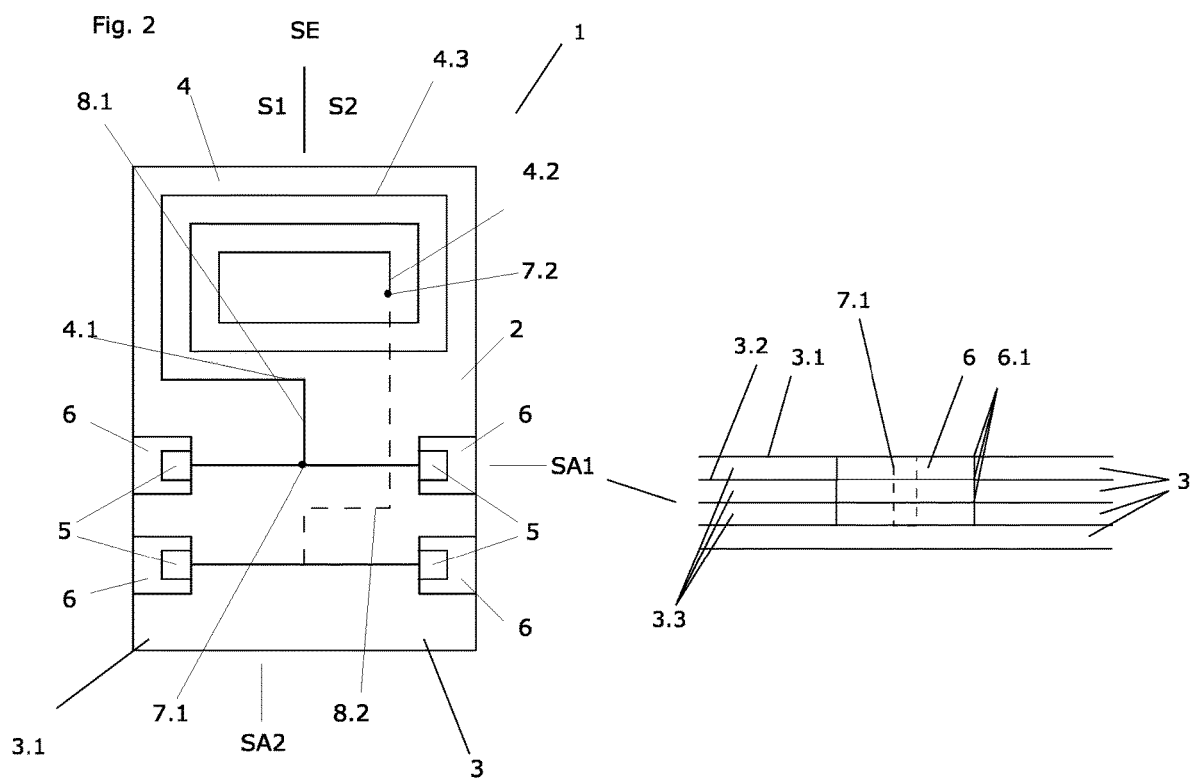

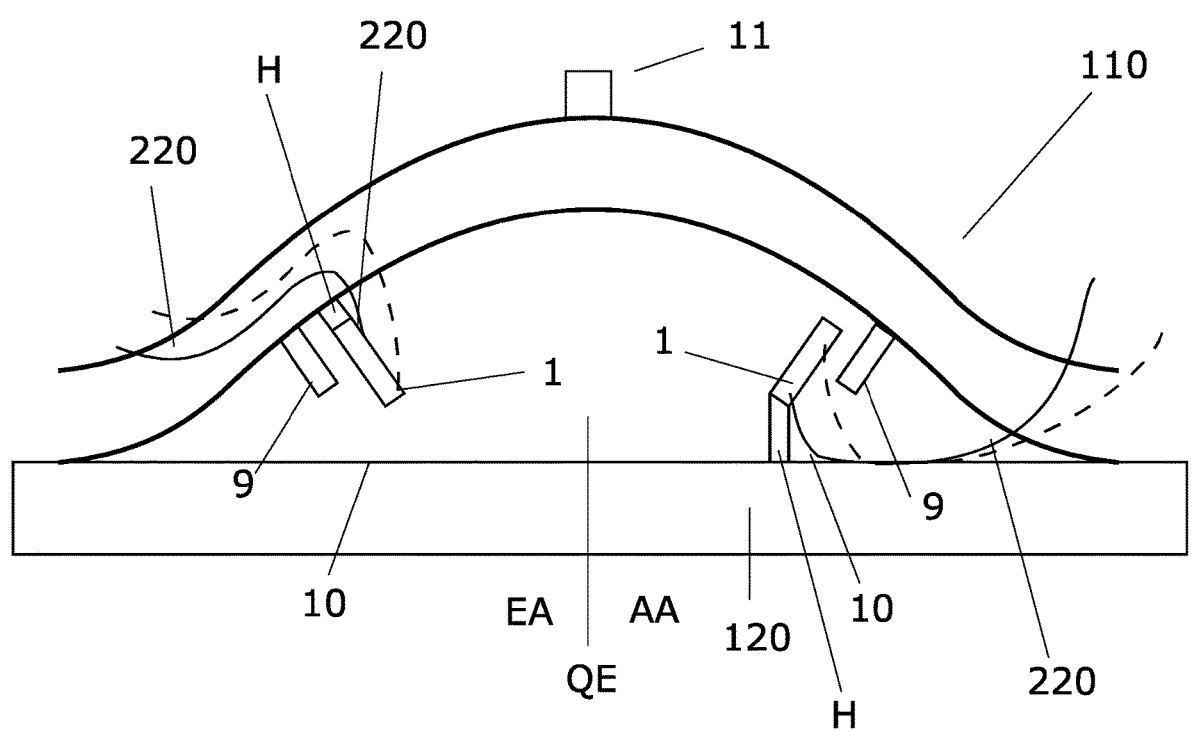

COIL APPARATUS OF AN OSCILLATION SENSOR OR OF AN OSCILLATION EXCITER, MEASURING TRANSDUCER AND MEASURING INSTRUMENT

CROSS-REFERENCE TO RELATED APPLICATIONS

The present application is related to and claims the priority benefit of German Patent Application No. 10 2018 119 330.0, filed on Aug. 8, 2018 and International Patent Application No. PCT/EP2019/070658 filed on Jul. 31, 2019, the entire contents of which are incorporated herein by reference.

TECHNICAL FIELD

The invention relates to a coil apparatus of an oscillation sensor or oscillation exciter of a measuring transducer or a measuring instrument for measuring a density or a mass flow of a medium flowing through at least one measuring tube of the measuring transducer, or measuring instrument, as well as to such a measuring transducer, and such a measuring instrument.

BACKGROUND

DE102015120087A1 describes a measuring instrument having a coil apparatus, which has two contacting elements for connecting to an electronic measuring/operating circuit of the measuring instrument by means of electrical lines. This has the disadvantage, for example, that in the case of securement of the coil apparatus and sectional guiding of the electrical lines on the measuring tube at least one electrical line must be led oscillatably via the coil apparatus to the contacting element. In this way, for example, a risk of a conductor break is increased. Also, different line lengths can be undesirable.

SUMMARY

An object of the invention is, consequently, to provide a coil apparatus, a measuring transducer and a measuring instrument, such that electrical lines for connecting the coil apparatus to an electronic measuring/operating circuit can be better led and/or the risk of a cable break is lessened.

The object is achieved with a coil apparatus as claimed in claim 1, a measuring transducer as claimed in claim 9 and a measuring instrument as claimed in claim 15.

A coil apparatus of the invention for an oscillation sensor or oscillation exciter of a measuring transducer or a measuring instrument for measuring a density or a mass flow of a medium flowing through at least one measuring tube of the measuring transducer, or measuring instrument, includes:
  a circuit board having at least one circuit board layer, wherein each circuit board layer has a first face and a second face planparallel to the first face,
  at least one coil adapted for registering or producing a time varying magnetic field, wherein the coil is embodied at least sectionally by means of an electrically conductive trace, wherein the coil is arranged on the first face and/or second face of a circuit board layer,
  wherein the at least one coil has a first coil end and a second coil end,
  wherein the coil apparatus has four contacting elements, wherein a first pair of contacting elements is electrically connected with the first coil end via a first connection, and wherein a second pair of contacting elements is electrically connected with the second coil end via a second connection,
  wherein the circuit board has a cutting plane extending perpendicularly to the faces,
  wherein the cutting plane divides the faces, in each case, into a first side and a second side,
  wherein, in each case, one contacting element of a pair of contacting elements is arranged on the first side, and wherein, in each case, one contacting element of a pair of contacting elements is arranged on the second side,
  wherein the coil apparatus is connectable by means, in each case, of at least one contacting element of the first pair and the second pair via electrical lines to an electronic measuring/operating circuit of the Coriolis measuring instrument.

In an embodiment, the circuit board includes a plurality of circuit board layers, which are stacked and connected via faces with neighboring circuit board layers.

In an embodiment, the contacting elements are arranged either on at least one, first face or on at least one, second face.

Thus, all contacting elements are visible in plan view.

In an embodiment, the contacting elements are arranged symmetrically relative to the cutting plane.

In an embodiment, the circuit board has a total number $N_{total}$ of circuit board layers, wherein $N_{total}$ is greater than 1,
  wherein the circuit board has at least one notch, which is embodied by at least one slot of an associated, contiguous group of circuit board layers, wherein the number of circuit board layers belonging to the associated group is less than $N_{total}$,
  wherein a contacting element belonging to a notch is arranged on a contacting circuit board layer, which borders on a corresponding group, wherein the contacting element at least partially forms a floor of the notch,
  wherein the circuit board layer carrying the contacting element is not covered by an adjoining circuit board layer at least in the region of the contacting element.

For example, the notch can be filled at least partially by means of an electrically conductive mass, which is adapted to hold an electrical line on the contacting element and to improve an electrical contact between electrical line and contacting element.

In an embodiment, a plurality of circuit board layers has, in each case, a coil with, in each case, a first coil end and, in each case, a second coil end,
  wherein the coils are interconnected serially and/or in parallel with one another,
  wherein the coils of different circuit board layers produce constructively interfering magnetic fields upon applying an electrical voltage between the first via and the second via.

By connecting a plurality of coils together, a sensitivity of the coil apparatus to a magnetic field change in the region of the coil apparatus can be increased, and stronger magnetic fields can be produced.

In an embodiment, the first coil ends are connected by means of a first via, and the second coil ends are connected by means of a second via.

In an embodiment, adjoining coils are connected, in each case, by means of one of their coil ends, wherein, in each case, an end of outer coils is connected, in each case, with a contacting element.

A measuring transducer of the invention for a measuring instrument for registering a mass flow or a density of a medium flowing through at least one measuring tube of the measuring transducer, includes:

- the at least one measuring tube having an inlet and an outlet and adapted to convey the medium between the inlet and the outlet;
- at least one oscillation exciter, which is adapted to excite the at least one measuring tube to execute oscillations;
- at least two oscillation sensors, which are adapted to register deflections of oscillations of at least one measuring tube;
- wherein at least one oscillation exciter as well as the oscillation sensors have, in each case, a coil apparatus with, in each case, at least one coil, as well as, in each case, a magnet apparatus,
- wherein the magnet apparatus and the coil apparatus are movable relative to one another, and
- wherein the magnet apparatus and the coil apparatus of an oscillation exciter, or oscillation sensor, as the case may be, interact by means of magnetic fields,
- wherein the measuring transducer has a support body, which is adapted to hold the measuring tube,
- wherein the oscillation sensors of the measuring transducer comprise, in each case, a coil apparatus of the invention.

In an embodiment, the coil apparatuses of the oscillation sensors are secured to the support body.

In an embodiment, a cross sectional plane divides the at least one measuring tube into an inlet side section and an outlet side section, wherein an inlet side coil apparatus and an outlet side coil apparatus with reference to the contacting elements are arranged mirror symmetrically about the cross sectional plane.

In an embodiment, the measuring transducer includes two manifolds, wherein a first manifold on an upstream directed side of the measuring transducer is adapted to receive a medium inflowing into the measuring transducer from a pipeline and to distribute such to the inlet of the at least one measuring tube, wherein a second manifold is adapted to receive medium draining from the at least one measuring tube and to guide such back into the pipeline.

In an embodiment, the measuring transducer includes two process connections, especially flanges, which are adapted to connect the measuring transducer with a pipeline.

In an embodiment, a difference of an electrical DC resistance of the coil apparatuses of different oscillation sensors is less than 3% and especially less than 2% and preferably less than 1% of an average value of the electrical DC resistances of the coil apparatuses.

A measuring instrument of the invention includes a measuring transducer of the invention;

- an electronic measuring/operating circuit, wherein the electronic measuring/operating circuit is adapted to operate the oscillation sensors and the oscillation exciter and is connected with these by means of electrical connections,
- wherein the at least one electrical connection is led by means of a cable guide to the electronic measuring/operating circuit,
- wherein the electronic measuring/operating circuit is further adapted to ascertain flow measured values and/or density measured values, and
- wherein the measuring instrument has especially an electronics housing for housing the electronic measuring/operating circuit.

BRIEF DESCRIPTION OF THE DRAWINGS

The invention will now be described based on examples of embodiments illustrated in the appended drawing, the figures of which show as follows:

FIG. 1 shows a measuring instrument 200 having a measuring transducer 100.

FIG. 2 shows a coil apparatus 1 of the present disclosure.

FIG. 3 shows the arrangement of two coil apparatuses of the present disclosure relative to a measuring tube of the measuring instrument, or measuring transducer.

DETAILED DESCRIPTION

FIG. 1 shows a measuring instrument 200 having a measuring transducer 100, wherein the measuring transducer has two measuring tubes 110, which are held by a support body 120 of the measuring transducer. The measuring tubes communicate with manifolds 130, thus on an inlet side with a first manifold 131 and on an outlet side with a second manifold 132, wherein the manifold 131 is adapted to receive a medium inflowing into the measuring transducer from a pipeline (not shown) and to distribute such uniformly to the measuring tubes. Correspondingly, the second manifold 132 is adapted to receive medium draining from the measuring tubes and to return such back to the pipeline. The measuring transducer is, in such case, connected to the pipeline via process connections 140, especially flanges. The measuring transducer includes an oscillation exciter 11, which is adapted to excite the measuring tubes to oscillate. The measuring transducer includes supplementally two oscillation sensors 10, which are adapted to register the oscillations of the measuring tubes. Those skilled in the art are, in such case, not limited to the numbers of measuring tubes, oscillation exciters and oscillation sensors shown here. The embodiment shown here is, in this regard, by way of example.

The measuring instrument includes an electronic measuring/operating circuit 210, which is adapted to operate the oscillation exciter as well as the oscillation sensors, and to calculate and to output mass flow- and/or density measured values of the medium. The electronic measuring/operating circuit is, in such case, connected by means of electrical connections 220 with the oscillation sensors as well as the oscillation exciter. The measuring instrument includes an electronics housing 230, in which the electronic measuring/operating circuit is arranged. For determining the mass flow, the measuring instrument utilizes the Coriolis effect of the medium flowing through the measuring tubes, wherein the flow characteristically influences the measuring tube oscillations.

FIG. 2 shows a plan view of a coil apparatus 1 of the invention having a circuit board 2, which has a plurality of circuit board layers 3 with, in each case, a first face 3.1 and a second face 3.2. A coil 4 having a first coil end 4.1 and a second coil end 4.2 is applied in the form of an electrically conductive trace 4.3, such as shown here, on a first face 3.1. The coil apparatus includes four contacting elements 5, which form a first pair of contacting elements 5.1 and a second pair of contacting elements 5.2. The first pair of contacting elements is, in such case, connected by means of a first connection 8.1 with the first coil end 4.1, and the second pair of contacting elements is, in such case, connected by means of a second connection 8.2 with the second coil end 4.2. The contacting elements of a pair are, in such case, arranged, in each case, on different sides of a cutting plane CP, thus on a first side S1 and on a second side S2, so that electrical connections to the electronic measuring/operating circuit are connectable unilaterally to the coil apparatus, thus either via the first side or via the second side. In this way, a leading of the electrical connections can be constructed safely, so that line breaks and different cable lengths can be avoided.

As shown in FIG. 2, a circuit board 3 can have a plurality of circuit board layers, wherein a plurality of circuit board layers have, in each case, a coil. The coils of a plurality of circuit board layers are, in such case, connected via vias 7.1, 7.2, so that the coils of different circuit board layers produce constructively interfering magnetic fields upon applying an electrical voltage between the vias. For example, such as shown here, a first via 7.1 can connect first coil ends 4.1 and a second via 7.2 second coil ends 4.2 of different coils together. This corresponds to forming a parallel circuit of the different coils.

Alternatively, adjoining coils can be connected together via adjoining coil ends, wherein a first coil end of an outer coil is connected with the first connection 8.1, and wherein a second coil end of an additional outer coil is connected with the second connection 8.2, and wherein adjoining coil ends are connected by means of a via. This would correspond to a series connection of different coils.

The contacting elements can be arranged in notches 6, which, for example, such as shown here in the side view 1 SV1, are embodied by slots 6.1 of an associated group 3.3 of circuit boards. The monolithic group forming a notch can be different in the case of different contacting elements. Not necessarily all contacting elements are arranged on one circuit board. Instead of slots 6.1, a circuit board layer can also have a reduced size relative to at least one adjoining circuit board layer, so that a contacting element is not covered by the circuit board layer of reduced size.

FIG. 3 shows a side view of a measuring tube 110 of a measuring instrument having two oscillation sensors 10 comprising, in each case, a coil apparatus 1 of the invention as seen from a side view SV2, see FIG. 2, wherein the coil apparatus 1 is connected, in the one case, by means of a holder H with the measuring tube 110 and is adapted to follow its oscillatory movements, such as shown in the inlet side section IS, or the coil apparatuses are connected mechanically with the support body 120, in each case, by means of a holder H, such as shown by the outlet side section OS. A cross sectional plane CP divides the at least one measuring tube into the inlet side section IS as well as the outlet side section OS. In the case of coil apparatuses arranged on the measuring tube, the arrangement of contacting elements according to the invention allow electrical connections 220 to be connected to a side of the coil apparatus toward the measuring tube. A connecting necessary in the state of the art of an electrical line to a side of the coil apparatus away from the measuring tube, see dashed line, can thus be omitted. By preventing oscillatable bends of the electrical connection, for example, the risk of a break of the contact between electrical connection and contact element is avoided. Magnet apparatuses 9, which, such as shown here, are mounted on a second measuring tube hidden in the view by the shown measuring tube and which are adapted to follow its oscillatory movements, interact in measurement operation with the associated coil apparatuses via electromagnetic fields. In the case of opposing measuring tube oscillations, thus, oscillations are registrable by means of electrical voltages induced in a coil.

In case the coil apparatuses are secured to the support body, the electrical connections can be led along the support body. In such case, the arrangement of the invention enables equally long electrical connections from contacting elements and an equal leading of the electrical connections.

Alternatively, the measuring transducer can have, for example, only one measuring tube, wherein magnet apparatuses of sensors are secured, for example, to the measuring tube, and associated coil apparatuses are secured to the support body or vice versa. Also, the measuring transducer can have more than two measuring tubes. Those skilled in the art can adapt coil apparatuses corresponding to their requirements.

The at least one measuring tube can, such as shown here, have at least one bend or also extend in a straight line. The applicability of the coil apparatus is independent of measuring tube geometry.

The invention claimed is:

1. A coil apparatus of an oscillation sensor or oscillation exciter of a measuring transducer or a measuring instrument for measuring a density or a mass flow of a medium flowing through at least one measuring tube of the measuring transducer, or measuring instrument, comprising:
   a circuit board having at least one circuit board layer, wherein each circuit board layer has a first face and a second face plane parallel to the first face,
   at least one coil adapted for registering or producing a time varying magnetic field, wherein the coil is embodied at least sectionally using an electrically conductive trace, wherein the coil is arranged on the first face or second face of a circuit board layer,
   wherein the at least one coil has, in each case, a first coil end and, in each case, a second coil end, wherein the coil apparatus has four contacting elements, wherein a first pair of contacting elements is electrically connected with a first coil end via a first connection, and wherein a second pair of contacting elements is electrically connected with a second coil end via a second connection,
   wherein the circuit board has a cutting plane extending perpendicularly to the faces, wherein the cutting plane divides the faces, in each case, into a first side and a second side, wherein, in each case, one contacting element of a pair of contacting elements is arranged on the first side, and wherein, in each case, one contacting element of a pair of contacting elements is arranged on the second side,
   wherein the coil apparatus is connectable, in each case, using at least one contacting element of the first pair and the second pair to an electronic measuring/operating circuit of the measuring instrument.

2. The coil apparatus of claim 1, wherein the circuit board includes a plurality of circuit board layers, which circuit board layers are stacked and connected via faces with neighboring circuit board layers.

3. The coil apparatus of claim 1, wherein the contacting elements are arranged either on at least one, first face or on at least one, second face.

4. The coil apparatus of claim 1, wherein the contacting elements are arranged symmetrically relative to the cutting plane.

5. The coil apparatus of claim 2, wherein the circuit board has a total number $N_{total}$ of circuit board layers, wherein $N_{total}$ is greater than 1,
   wherein the circuit board has at least one notch, which is embodied by at least one slot of an associated, contiguous group of circuit board layers,
   wherein the number of circuit board layers belonging to the associated group is less than $N_{total}$,
   wherein a contacting element belonging to a notch is arranged on a contacting circuit board layer, which borders on a corresponding group, wherein the contacting element at least partially forms a floor of the notch, wherein the circuit board layer carrying the contacting element is not covered by an adjoining circuit board layer at least in the region of the contacting element.

6. The coil apparatus of claim 5, wherein a plurality of circuit board layers have, in each case, a coil with, in each case, a first coil end and, in each case, a second coil end, wherein the coils are interconnected serially or in parallel with one another, wherein the coils of different circuit board layers produce constructively interfering magnetic fields upon applying an electrical voltage between via a first connection and via a second connection.

7. The coil apparatus of claim 6, wherein the first coil ends are connected by means of via a first connection, and wherein the second coil ends are connected by means of via a second connection.

8. The coil apparatus of claim 6, wherein adjoining coils are connected, in each case, by means of one of their coil ends, wherein, in each case, an end of outer coils is connected with, in each case, a contacting element.

9. A measuring transducer of a measuring instrument for registering a mass flow or a density of a medium flowing through at least one measuring tube of the measuring transducer, comprising:

the at least one measuring tube having an inlet and an outlet and adapted to convey the medium between inlet and outlet;

at least one oscillation exciter, which is adapted to excite the at least one measuring tube to execute oscillations;

at least two oscillation sensors, which are adapted to register deflections of oscillations of at least one measuring tube;

wherein at least one oscillation exciter as well as the oscillation sensors have, in each case, a coil apparatus with, in each case, at least one coil, as well as, in each case, a magnet apparatus, wherein the magnet apparatus and the coil apparatus are movable relatively to one another, wherein the magnet apparatus and the coil apparatus of an oscillation exciter, or oscillation sensor are adapted to interact by means of magnetic fields, wherein the measuring transducer has a support body, which is adapted to hold the measuring tube, wherein the oscillation sensors comprise, in each case, a coil apparatus, wherein the coil apparatus includes:

at least one coil adapted for registering or producing a time varying magnetic field, wherein the coil is embodied at least sectionally using an electrically conductive trace, wherein the coil is arranged on the first face or second face of a circuit board layer, wherein the at least one coil has, in each case, a first coil end and, in each case, a second coil end, wherein the coil apparatus has four contacting elements, wherein a first pair of contacting elements is electrically connected with a first coil end via a first connection, and wherein a second pair of contacting elements is electrically connected with a second coil end via a second connection, wherein the circuit board has a cutting plane extending perpendicularly to the faces, wherein the cutting plane divides the faces, in each case, into a first side and a second side, wherein, in each case, one contacting element of a pair of contacting elements is arranged on the first side, and wherein, in each case, one contacting element of a pair of contacting elements is arranged on the second side, wherein the coil apparatus is connectable, in each case, using at least one contacting element of the first pair and the second pair to an electronic measuring/operating circuit of the measuring instrument.

10. The measuring transducer of claim 9, wherein the coil apparatuses of the oscillation sensors are secured to the support body.

11. The measuring transducer of claim 9, wherein a cross sectional plane divides the at least one measuring tube into an inlet side section and an outlet side section, wherein an inlet side coil apparatus and an outlet side coil apparatus with reference to the contacting elements are arranged mirror symmetrically about the cross sectional plane.

12. The measuring transducer of claim 9, wherein the measuring transducer has two manifolds, wherein a first manifold in an upstream directed side of the measuring transducer is adapted to receive a medium inflowing into the measuring transducer from a pipeline and to distribute such to the inlet of the at least one measuring tube, wherein a second manifold is adapted to receive medium draining from the at least one measuring tube and to guide such back into the pipeline.

13. The measuring transducer of claim 9, wherein the measuring transducer includes two process connections, which are adapted to connect the measuring transducer with a pipeline.

14. The measuring transducer of claim 9, wherein a difference of an electrical DC resistance of the coil apparatuses of different oscillation sensors is less than 3% of an average value of the electrical DC resistances of the coil apparatuses.

15. A measuring instrument, comprising:

a measuring transducer comprising:

an electronic measuring/operating circuit, wherein the electronic measuring/operating circuit is adapted to operate the oscillation sensors and the oscillation exciter and is connected with these by means of electrical connections, wherein the at least one electrical connection is led to the electronic measuring/operating circuit, wherein the electronic measuring/operating circuit is further adapted to ascertain flow measured values and/or density measured values, wherein the measuring instrument has an electronics housing for housing the electronic measuring/operating circuit.

* * * * *